Figure 1:
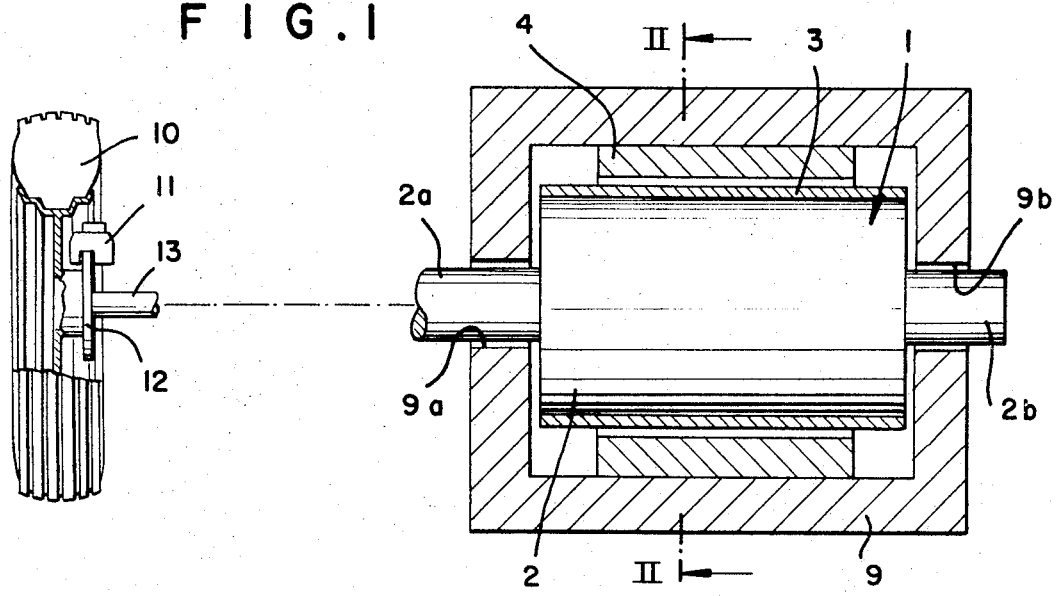

United States Patent

[11] 3,555,326

[72] Inventors Abootaleb Talebi
Ober Roden-Messenhausen;
Erwin Schlitz, Heusenstamm, Germany
[21] Appl. No. 798,636
[22] Filed Feb. 12, 1969
[45] Patented Jan. 12, 1971
[73] Assignee Alfred Teves GMBH
Frankfurt am Main, Germany
a corporation of Germany
[32] Priority Feb. 17, 1968
[33] Germany
[31] 1,673,443

[54] ACCELEROMETER FOR VEHICULAR ANTI-SKID SYSTEM WITH SHEATHED ROTOR
9 Claims, 2 Drawing Figs.
[52] U.S. Cl...................................... 310/168,
310/105, 310/155
[51] Int. Cl.....................................H02k 19/20
[50] Field of Search........................... 310/168,
170, 171, 169, 70, 70.1, 154, 40, 105, 258, 181,
155; 322/51, 52, 49; 179/100.2T

[56] References Cited
UNITED STATES PATENTS

| | | | |
|---|---|---|---|
| 2,177,472 | 10/1939 | Barrett.......................... | 310/154 |
| 2,519,365 | 8/1950 | Goertz.......................... | 310/171 |
| 3,018,395 | 1/1962 | Carlstein...................... | 310/40 |
| 3,482,130 | 2/1969 | Woodward................... | 310/168 |

FOREIGN PATENTS

| | | | |
|---|---|---|---|
| 870,234 | 5/1970 | Great Britain................ | 310/168 |

*Primary Examiner*—D. F. Duggan
*Assistant Examiner*—R. Skudy
*Attorney*—Karl F. Ross

ABSTRACT: An accelerometer has a solid cylindrical ferromagnetic rotor rotationally coupled to a vehicle wheel and coated with a conductive nonferromagnetic metal sheath. Magnets create a radial primary flux through the rotor while pickup coils located on the stator outside this field sense any variation in flux of a secondary field produced by the eddy currents in the coating. The output of these differentiating (pickup) coil is a function of the angular acceleration of the rotor and is used to regulate braking force in the wheel.

PATENTED JAN 12 1971 3,555,326

INVENTORS:
Abootaleb Talebi
BY Erwin Schlitz

*Karl F. Ross*
ATTORNEY

ACCELEROMETER FOR VEHICULAR ANTI-SKID SYSTEM WITH SHEATHED ROTOR

Our present invention relates to an accelerometer and, more particularly, to an improved accelerometer in a vehicular antiskid brake system.

For best braking characteristics the friction between the brake drum or disc and the brakeshoes should be more than that between the vehicle wheel and the road surface; that is, relative sliding displacement is permissible between the brake drum or disc and the brakeshoes, but not between the wheel and the road surface. Furthermore, it may be useful for a driver to know just how much he is accelerating for optimum motor efficiency as, for example, in race or rally driving.

Devices have been proposed which measure vehicle deceleration and acceleration mainly for controlling a vehicular antiskid brake system. These devices require some sort of accelerometer which is coupled to the vehicle wheel and gives an output which is a function of the vehicular acceleration and/or deceleration.

One such system is described in the commonly assigned copending application Ser. No. 762,402 filed Sept. 25, 1968 now U.S. Pat. No. 3,522,973, by Hans-Christof Klein and Gunther Werner and entitled "Method of and Apparatus for Metering Angular Acceleration." Here an analogue output is produced at the vehicle wheel which is then either differentiated or integrated in two consecutive time intervals and subtracted to produce a final output which is a function of vehicle acceleration.

Another arrangement, described in the commonly assigned copending application Ser. No. 758,022 filed Sept. 6, 1968 by Fritz Ostwald and entitled "Accelerometer," provides a mass which is indirectly coupled to a vehicle wheel such that its inertia is transmitted to a strain guage which gives an output that is a function of vehicle acceleration. So-called eddy-current tachometers also have been proposed wherein a magnetic field is created by eddy currents in a rotor or stator. With proper construction, as in the commonly assigned copending application Ser. No. 762,525 filed Sept. 25, 1968 by Hans-Christof Klein and entitled "Eddy-Current Tachometers for Vehicular Brake Systems and the Like," this magnetic field varies with the angular velocity of the vehicle wheel such that a pickup coil generates an output which, once again, is a function of vehicle acceleration.

The electric output of such eddy-current tachometers depends on the flux strength of the magnetic field in the rotor, which in turn depends on the air-gap induction, the length of the rotor in the field, and the rotational speed of the rotor. A formula for radially or diametrically directed magnetic fields in magnetic material can be set up as follows:

$$B_L = \frac{B_r}{\frac{\mu \cdot \delta}{a}}$$

wherein: $B_L$ is the air-gap induction, $\delta$ is the width of the air gap, $B_r$ is the magnetic remainence (which is proportional to the air-gap induction), $\mu$ is the reversible permeability and $a$ is the magnetic volume.

Thus the air-gap induction density is inversely proportional to the magnitude of the air gap. Therefore, the size of the air gap should be held to a minimum for maximum accelerometer sensitivity.

The so-called Ferrari tachometer has a magnet yoke which generates a field transverse to a hollow nonferromagnetic cylinder which rotates about its axis coupled to a vehicle wheel. The field is transverse to the rotation axis. Pickup coils are mounted in a ferromagnetic core which is nonrotatably fixed within the rotor cylinder. For maximum sensitivity, this nonferromagnetic rotor, which is in the form of a cup, must be as thin as possible since it acts effectively as part of the air gap. Not only must it be very thin, but it must be completely symmetrical about the axis, any variations in thickness or diameter being translated into spurious signals giving a low signal-to-noise ration. Obviously, the cup-shaped rotor can only be made thin to a degree, since with excessive thinness it simply lacks the strength to hold up under rough use. Furthermore, the accelerometer so build must generally be provided on the end of a rotating shaft or coupled through a gear or belt linkage with the shaft.

It is therefor the principal object of the present invention to provide an improved accelerometer for use in a vehicular antiskid brake system.

A further object is to provide an accelerometer of increased sensitivity and simple construction.

A yet further object is to provide an accelerometer which can be mounted along a rotating shaft with little difficulty.

Another object is to provide an automotive brake system wherein the braking force is regulated according to angular deceleration of the vehicle wheel or wheels.

These and other objects are attained in accordance with features of the present invention wherein the rotor comprises solid cylindrical ferromagnetic core rotatable about its axis and coupled to the vehicle wheel and having a thin coating of highly conductive nonferromagnetic metal forming a continuous sheath around it. The stator is a cylinder of ferromagnetic material and has two magnetic shells which generate a radial magnetic field through the rotor. This stator further has two differentiating pickup coils which are located out of the primary magnetic field (at an angle of 90° thereto) but adjacent the surface of the rotor.

This coating on the rotor is applied galvanically (electroplating), by dipping or by vapor deposition, so that it is of very small thickness e.g. 0.5 microns to 5 millimeters) and very uniform. This allows a very exact coating to be made while the advantageously iron core has a high permeability which enhances greatly the sensitivity of the device.

Furthermore, the core is journaled at both ends which makes for a very simple, small, and rugged construction while allowing it to be driven from either end or simply mounted around a portion of a rotating shaft.

Figure 2:
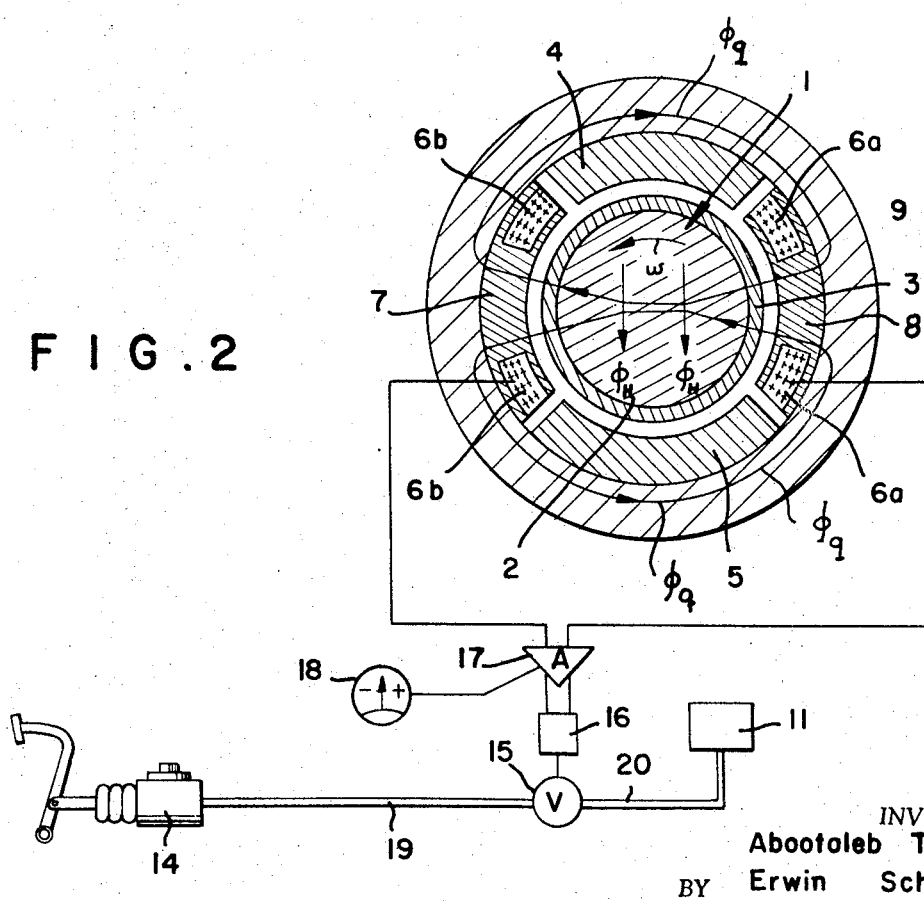

These and other objects, features, and advantages of the present invention will be more fully described in the following, with reference to the accompanying drawing in which:

FIG. 1 is an axial section through an accelerometer according to our invention; and FIG. 2 is a section along line II–II of FIG. 1, with an antiskid brake system shown diagrammatically.

As shown in FIGS. 1 and 2, a housing 9 of ferromagnetic material is formed cylindrically with axial bores 9a and 9b. A rotor 1 comprising an iron core 2 with end piece 2a and 2b and a from 3 microns to several millimeters thick coating 3 of nonferromagnetic material, preferably copper, is journaled in these bores 9a and 9b by the end pieces 2a and 2b and is rotatable in the hollow interior of the housing 9.

Mounted inside the cylindrical housing sleeve 9 are two permanently magnetic shells 4 and 5 forming a north and south pole respectively, with the housing 9 acting as magnetic return path for the flux $\Phi_4$ flowing between them. The pole pieces 4 and 5 are concave coaxially with the rotor and are closely spaced therefrom. To each side of the field $\Phi_4$ is a pickup of differentiating coil 6a and 6b wound around a respective core 7 and 8 and lying surrounded by the field $\Phi_q$ created by eddy currents in the coating 3. The cores 7 and 8 may use the stator as the magnetic return and/or may be part of or separate from the stator.

As further shown in FIG. 2 the pickup coils 6a and 6b are both coupled to an amplifier 17 as discussed on pages 137ff. of Basic Theory and Application of Transistors (U.S. Government Printing Office, Washington, D.C., 1959). The other side of this amplifier 17 is connected to a zero-center meter 18 on the vehicle instrument panel and a solenoid 16 which operates a valve 15 as described in Chapter 9 of Fluid Power (U.S. Government Printing Office, Washington D.C., 1966). A pedal-operated master cylinder 14 as discussed on page 438 of Principles of Automotive Vehicles (U.S. Government Printing Office, Washington, D.C., Jan. 1956) is connected to one side of this valve 15 through a conduit 19. A conduit 20 connects the other side of the valve 15 to a disc brake 11 shown in the commonly assigned copending application Ser. No.

754,086 filed 20 Aug. 1968 by Hans A. Beller and entitled "Spot-Type Disc Brake." As shown in FIG. 1 this brake 11 is nonrotatably mounted on a brake disc 12 which is rotationally coupled to the drive shaft 13 of a vehicle wheel 10. Actuation of the master cylinder 14 pressurizes the brake 11 through the lines 19 and 20 and operates this brake 11. The end piece 2a of the rotor 1 is also coupled to this shaft 13.

Our accelerometer and brake system function as follows:

Under normal running conditions with a constant vehicle velocity the rotor 2 turns also at a constant angular velocity $\omega$ in the field $\Phi_H$ thereby creating eddy currents in the coating 3. These eddy currents form their own magnetic field $\Phi_q$ which is also constant and which surrounds the pickup coils 6a and 6b. As long as the rotational speed $\omega$ remains constant, the meter 18 rests at zero and the solenoid 16 is unaffected since the coils 6a and 6b generate no voltage.

However, any increase or decrease in velocity $\omega$ causes a corresponding increase or decrease in the flux density of the field $\Phi_q$ which is picked up by the coils 6a and 6b and transmitted through the amplifier 17 to the meter 18 and the solenoid 16. For acceleration the meter 18 registers but the brake system remains unaffected; for deceleration beyond a predetermined limit—corresponding to excessive braking force and a skid—the valve 15 is at least partially closed by the solenoid 16 to limit the braking force in the brake 11. Thus the accelerometer senses a deceleration rate which is so high or which has terminated while the vehicle is in motion, thereby indicating a skid or an impending skid and adjusts the braking force to compensate.

This accelerometer could be applied also to an antiskid brake system as described in the commonly assigned copending application Ser. No. 762,601 filed Sept. 25, 1968 by Hans-Christof Klein and entitled "Nonskid Brake System for Motor Vehicle with Pressurized Hydraulic System" wherein at one predetermined level of deceleration the supply of hydraulic fluid to the wheel cylinders is cut off and at a second higher level of deceleration these cylinders are simply drained to eliminate skidding.

The cores 7 and 8 of the pickup of differentiating coils 6a and 6b can be formed as one piece with the housing 9 or can be fastened thereto later. Their positioning at around 90° relative to the primary field $\Phi_H$ is important since this allows for the best magnetic linkage between the coils 6a and 6b and the field $\Phi_q$.

The coating 3 is galvanically applied to the core 2 or deposited by evaporation or by dipping in a molten-metal bath. In this way as long as the core 2 is carefully machined, the coating 3 must be even.

The improvement described and illustrated is believed to admit of many modifications within the ability of persons skilled in the art, all such modifications being considered within the spirit and scope of the invention except as limited by the appended claims.

We claim:

1. In a vehicular antiskid brake system, an accelerometer comprising:
   a rotor including a solid substantially cylindrical ferromagnetic core rotatable about its axis, and a layer of a nonferromagnetic conductive metal forming a continuous sheath around said core;
   a stator surrounding said rotor and nonrotatable relative thereto;
   means on said stator forming a primary radial magnetic field through said rotor for inducing eddy currents in said sheath of nonferromagnetic metal; and
   a pickup coil on said stator responsive to changes in a secondary magnetic field generated by said eddy currents in said coating.

2. The accelerometer defined in claim 1 wherein said pickup coil is disposed outside of said primary magnetic field.

3. The accelerometer defined in claim 1 wherein said layer is a coating applied to said core.

4. The accelerometer defined in claim 1 wherein said rotor is provided with axial shafts at ends of the rotor, said housing being formed with journals rotatably receiving said shafts.

5. The accelerometer defined in claim 1 wherein said means forming said magnetic field includes at least one permanent magnet having pole pieces on diametrically opposite sides of said rotor.

6. The accelerometer defined in claim 5 wherein said means forming said primary field includes at least two permanent magnets disposed on diametrically opposite sides of said rotor.

7. The accelerometer defined in claim 5 wherein two such pickup coils are provided on diametrically opposite sides of said rotor.

8. The accelerometer defined in claim 7 wherein said pickup coils are offset angularly about said axis from said poles by about 90°.

9. The accelerometer defined in claim 1 wherein said stator comprises a cylindrical ferromagetic sleeve surrounding said core and said sheath over the entire length thereof, and a pair of end pieced flanking said core and said sheath, said core being iron and said sheath being copper; said means forming said primary magnetic field includes a pair of pole pieces on said stator of opposite magnetic polarity closely spaced from said sheath on diametrically opposite sides of said rotor and confronting said rotor with a cylindrical concavity centered on said axis; said rotor includes a pair of axially extending shafts of a diameter less than that of said core and said sheath and journaled in said end pieces; and said pickup coil comprises two differentiating coils located on diametrically opposite sides of said rotor and offset by 90° from said pole pieces about said axis, said differentiating coils having an output related to the angular acceleration of said rotor.